United States Patent [19]

Norcia

[11] 4,197,931
[45] Apr. 15, 1980

[54] CLUTCH FRICTION PLATE AND DAMPER SPRING CONSTRUCTION

[76] Inventor: John A. Norcia, 2906 Sussex St., Canton, Stark County, Ohio 44718

[21] Appl. No.: 819,129

[22] Filed: Jul. 26, 1977

[51] Int. Cl.$^2$ .......................... F16D 3/14; F16D 3/64
[52] U.S. Cl. ............................. 192/106.2; 64/15 C; 64/27 C
[58] Field of Search ................... 64/15 C, 27 C, 27 R; 192/106.2

[56] References Cited

U.S. PATENT DOCUMENTS

| 2,674,863 | 4/1954 | Thelander | 64/15 C |
|---|---|---|---|
| 3,080,734 | 3/1963 | Crankshaw | 64/15 C |
| 3,809,198 | 5/1974 | Mori | 192/106.2 |
| 3,897,859 | 8/1975 | Norcia | 64/27 R |

FOREIGN PATENT DOCUMENTS

| 2304699 | 8/1973 | Fed. Rep. of Germany | 192/106.2 |
|---|---|---|---|
| 1213399 | 10/1959 | France | 192/106.2 |
| 512009 | 7/1938 | United Kingdom | 192/106.2 |

Primary Examiner—C. J. Husar
Assistant Examiner—David C. Reichard
Attorney, Agent, or Firm—Frease & Bishop

[57] ABSTRACT

A friction plate for a vehicle clutch assembly having an improved damper spring. The damper spring includes a compression coil spring member which is encapsulated within an elastomer. The elastomer fills the interior of the spring and the spaces between the individual spring coils. The spring-elastomer combination has a greater dampening effect than the total dampening effect of the spring and elastomer if acting independent of each other. A plurality of the encapsulated springs are mounted individually in axially aligned openings provided in an inner hub flange, a friction drive plate and a retainer plate, all of which are mounted concentrically with respect to each other, with the hub flange being integral with a clutch hub. The encapsulated spring rotatably couples together the friction drive plate and retainer plate with the hub. Friction elements are mounted on the outer periphery of the drive plate. The encapsulated spring absorbs the shock and reduces chatter upon the friction elements coupling engaging another clutch member, and transmits the coupling drive forces between the drive plate and hub.

16 Claims, 12 Drawing Figures

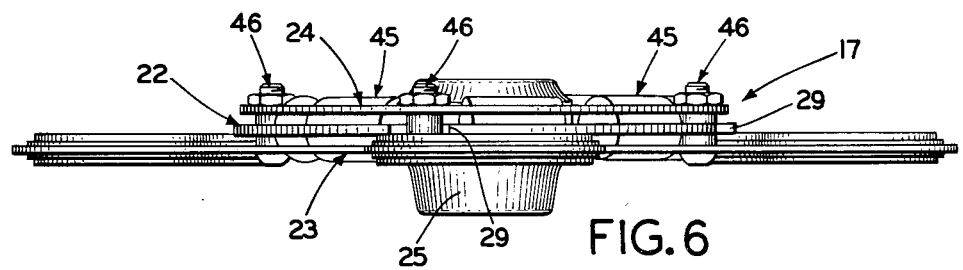
FIG. 6
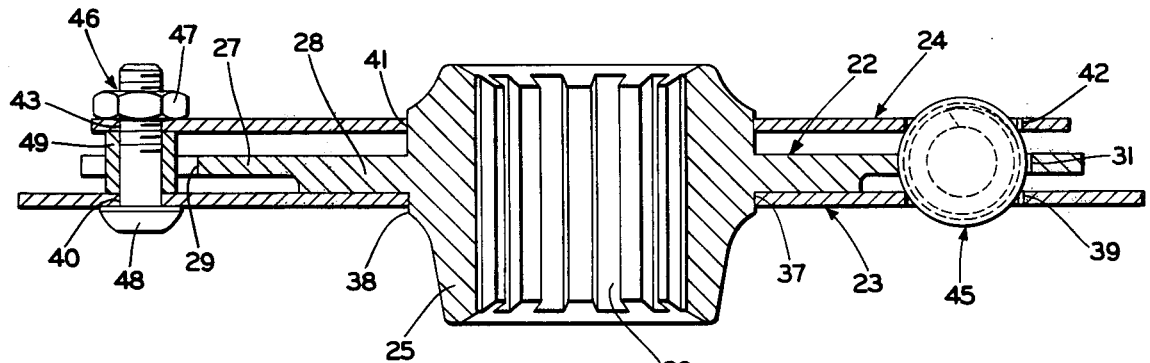
FIG. 7
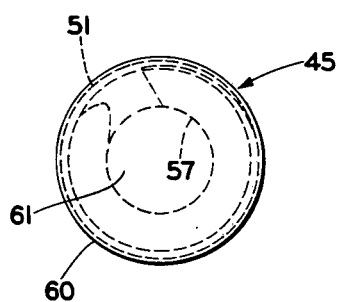
FIG. 10
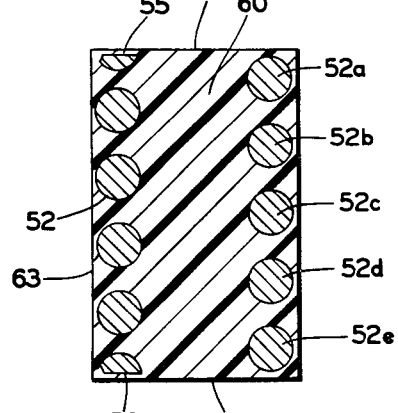
FIG. 11
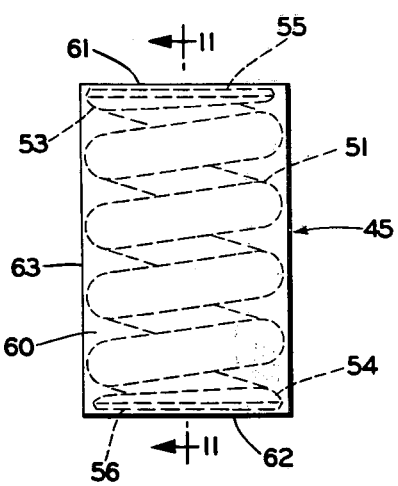
FIG. 9
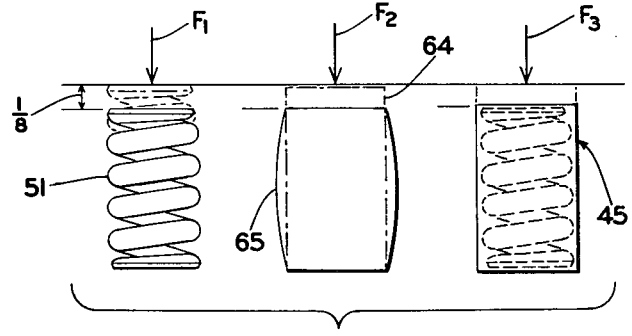
FIG. 8
FIG. 12

CLUTCH FRICTION PLATE AND DAMPER SPRING CONSTRUCTION

BACKGROUND OF THE INVENTION

1. Field of the Invention

The invention relates to clutches, and in particular to vehicle clutch assemblies. More particularly, the invention relates to a friction plate mounted within the clutch assembly having a unique shock absorbing damper spring with increased stiffness without an increase in size, to reduce damaging vehicle driveline shock and clutch damage. The invention also relates to such a unique spring construction in which a coil spring is encapsulated in an elastomer to increase its loading characteristics.

2. Description of the Prior Art

There are numerous types, styles and sizes of friction clutches having a countless number of various components to increase the efficiency, wear and clutch operation in both manual and automatic vehicle transmissions. Many clutch constructions have a friction drive plate and a plurality of resilient elements to rotationally couple the drive plate to a hub member. These resilient members absorb much of the engagement shock and torque when the friction elements, which are attached to the drive plate, are brought into coupling engagement with similar friction elements on a flywheel, pressure plate, etc., on the driving member of the clutch. These resilient members reduce considerably the shock on the vehicle driveline which includes the universal joint, transmission, drive shaft and differential. These resilient elements also tend to reduce clutch chatter.

A number of clutch friction plate designs have been developed which use various arrangements of resilient coupling elements to achieve the shock absorbing and chatter reducing effects. The most general type of resilient element used is a coil compression spring, such as shown in U.S. Pat. Nos. 2,058,575, 2,076,373 and 2,613,785. Other clutch constructions have used a resilient rubber insert or bushing in place of a coil spring for this purpose. Examples of these constructions are shown in U.S. Pat. Nos. 1,818,610, 2,299,010 and 3,897,859.

Many of these known clutch friction plate constructions which use either a spring or rubber bushing as the resilient member, have proved satisfactory for usual torques and shocks encountered during clutch coupling engagement. Problems, however, have developed in certain clutch constructions, especially when used in high performance racing vehicles. These racing vehicle clutches develope excessive torques and shocks which result in excess relative rotation between the hub member and friction drive plate. This excess rotation may cause the coupling springs to bottom out, resulting in destruction of the springs or shearing and damaging of the hub member or stop pins which are used in many such clutch constructions. Much of this excess torque and shock is transmitted to the vehicle driveline, causing damage and maintenance problems to the vehicle.

In order to reduce this clutch damage, it is necessary to increase the stiffness of the rotational coupling springs. This is difficult in many clutch designs in that there is insufficient room for additional or bigger springs, and in most designs the springs which are being used have the maximum amount of stiffness which is feasible.

Therefore, the need has existed for an improved resilient member for rotationally coupling together the hub member and drive plate of a clutch friction plate which has stiffer shock absorbing and loading characteristics without increasing the physical size and configuration of the spring component. No clutch construction of which I am aware uses a coil compression spring encapsulated in an elastomer to achieve these results.

SUMMARY OF THE INVENTION

Objectives of the invention include providing an improved clutch friction plate and damper spring construction in which a usual compression coil spring is encased or encapsulated in an elastomer to appreciably increase the spring stiffness and load characteristics without changing the external size and configuration of the spring, and in which the encapsulated spring can be mounted within a usual clutch assembly without requiring any modifications or changes to the clutch components; providing such a spring construction in which the elastomer may be formed of various urethane formulations to enable the encapsulated spring to resist high temperatures and exhibit high abrasion resistance when used in clutch assemblies developing high internal temperatures; providing such a spring construction in which the elastomer may be formed of various rubber or other synthetic resilient materials, each having particular features in order to provide certain operating characteristics depending upon the particular application in which the encapsulated spring is to be used; providing such a spring construction in which the coil spring may have various configurations, such as a helical spring being of the tension, compression or torsion type, and having various cross-sectional configurations, such as rectangular, circular, etc., all of which may be completely or partially encapsulated with a selected elastomer for use in a particular application in order to increase the stiffness and achieve the desired spring loading characteristics; and providing such a clutch friction plate and spring construction in which the springs can be produced relatively inexpensively by usual elastomer molding processes, and which when incorporated in the clutch friction plate, eliminates difficulties heretofore encountered, achieves the stated objectives simply, effectively and economically, and which solves problems and satisfies existing needs.

These objectives and advantages are obtained by the improved clutch friction plate and spring construction, the general nature of which may be stated as including, hub means adapted to be mounted on a vehicle transmission shaft; drive plate means mounted on the hub means and rotationally movable with respect to said hub means; friction means mounted on the drive plate means for coupling frictional engagement with a corresponding driving clutch component; a plurality of openings formed in the hub means and drive plate means, certain of said openings being axially aligned with respect to each other; damper spring means mounted within the aligned openings and extending between the hub means and drive plate means for rotationally coupling together the hub means and drive plate means; and the damper spring means including a compression coil spring and an elastomer, said elastomer encasing at least a majority portion of the coil spring to increase the compression resistance of the coil spring, thereby reducing the relative rotation between the hub means and drive plate means upon the friction means being coupling engaged with the driving clutch component.

The spring construction also including a plurality of integral coils forming a generally open interior, with certain of said coils being spaced from each other to form a compression spring; an elastomer encapsulating the spring and filling the open interior and spaces between said certain coils; the spring being a cylindrical helical spring having a circular cross section; the elastomer forming a cylindrical configuration with a continuous, cylindrical side wall enclosing the coils of the spring; and the elastomer being urethane.

BRIEF DESCRIPTION OF THE DRAWINGS

A preferred embodiment of the invention—illustrative of the best mode in which applicant has contemplated applying the principle—is set forth in the following description and shown in the accompanying drawings, and is particularly and distinctly pointed out and set forth in the appended claims.

FIG. 6 is an end elevation of the clutch friction plate looking in the direction of arrows 6—6, FIG. 5;

FIG. 7 is an enlarged sectional view taken on line 7—7, FIG. 5;

FIG. 8 is an enlarged sectional view taken on line 8—8, FIG. 5;

FIG. 9 is an enlarged elevational view of the improved damper spring construction removed from the clutch friction plate of FIGS. 1, 5, 6 and 7;

FIG. 10 is a top plan view of the damper spring construction of FIG. 9;

FIG. 11 is a vertical sectional view taken on line 11—11, FIG. 9; and

FIG. 12 is a diagrammatic view showing the damper spring construction and its individual components when subject to an axial force.

Similar numerals refer to similar parts throughout the drawings.

DESCRIPTION OF THE PREFERRED EMBODIMENT

Figure 1:
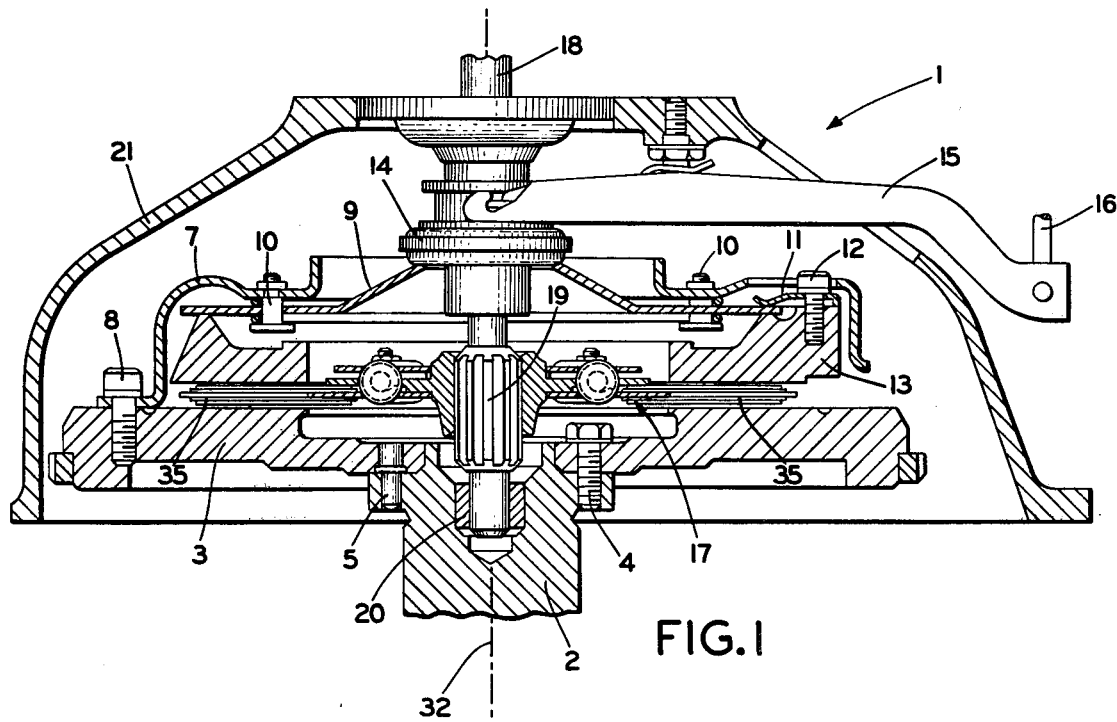
FIG. 1 is a vertical sectional view through one type of clutch assembly having the improved friction plate and damper spring construction incorporated therein.

One type of clutch mechanism in which the improved clutch friction plate assembly may be incorporated is indicated generally at 1, FIG. 1. Clutch mechanism 1 includes a driving shaft 2 extending from the vehicle engine and connected to a flywheel 3 by bolts 4 and dowel pins 5. A cover 7 is mounted on flywheel 3 by bolts 8, and includes a diaphragm spring 9 mounted thereon by pins 10. A retracting spring 11 is mounted by a bolt 12 on pressure plate 13. Spring 9 communicates with a throw-out bearing 14 engaged by operating lever 15, which in turn is connected to the clutch actuating pedal by a rod 16.

Figure 5:
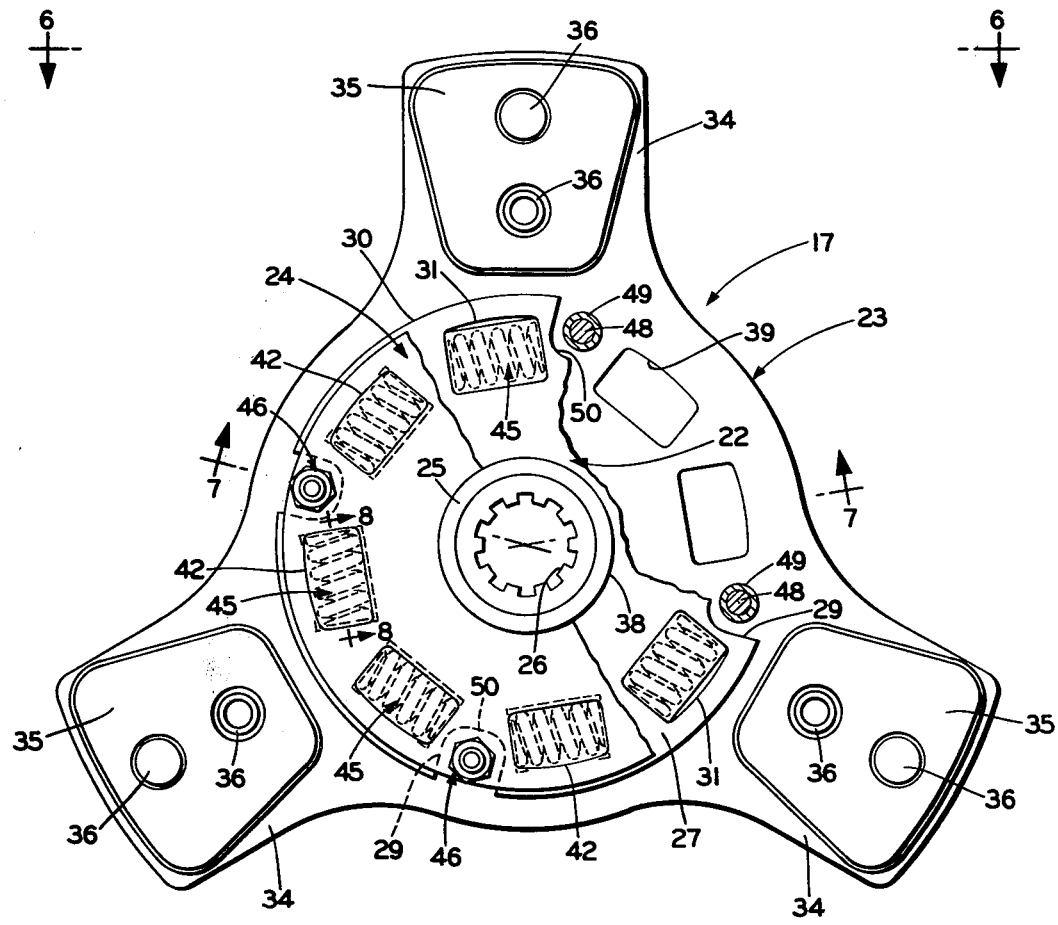
FIG. 5 is an enlarged top plan view of the clutch friction plate and damper spring construction, with portions broken away and in section.

The improved friction plate assembly, indicated generally at 17 (FIG. 5), is mounted on the transmission input shaft 18 by a splined shaft portion 19. The inner end of driven shaft 18 is mounted in a pilot bushing 20 located within the end of engine shaft 2. An outer housing 21 encloses the clutch components. The above friction plate mechanism 1 is merely an illustration of one type of clutch in which the improved friction plate assembly 17 may be incorporated.

Friction Plate Assembly

Figure 3:
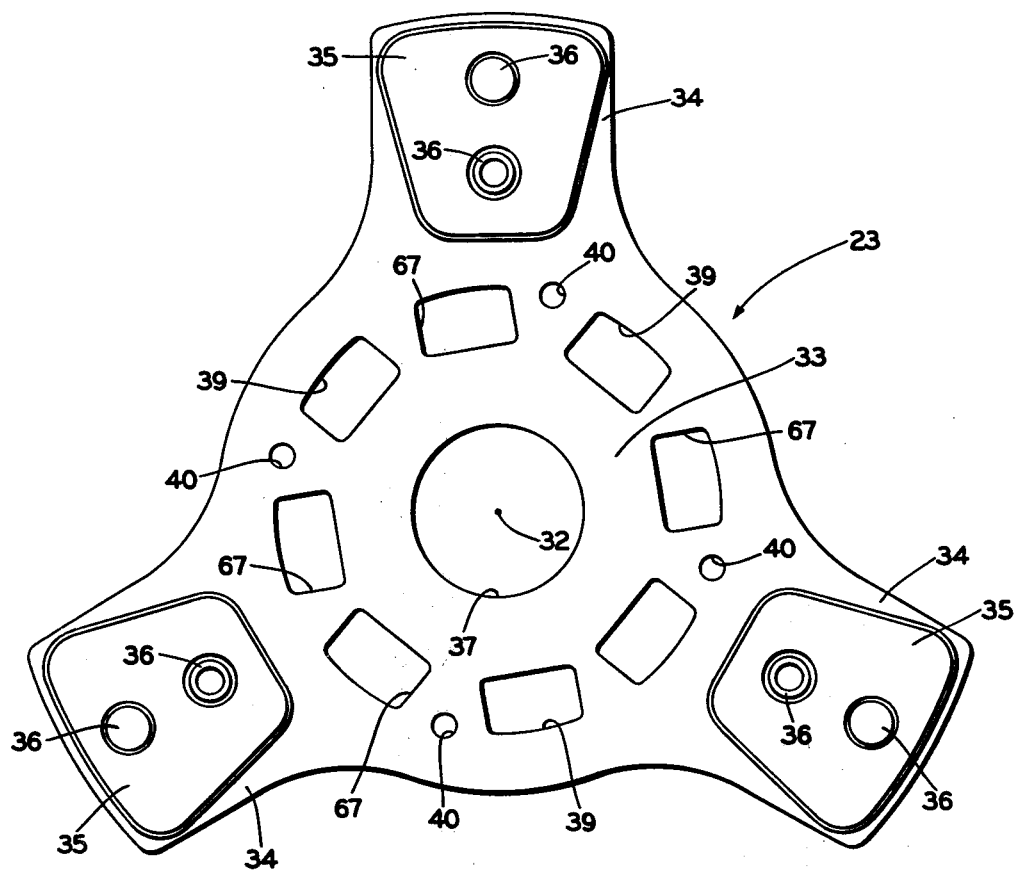
FIG. 3 is a top plan view of the friction drive plate of the improved clutch friction plate.
Figures 2, 4:
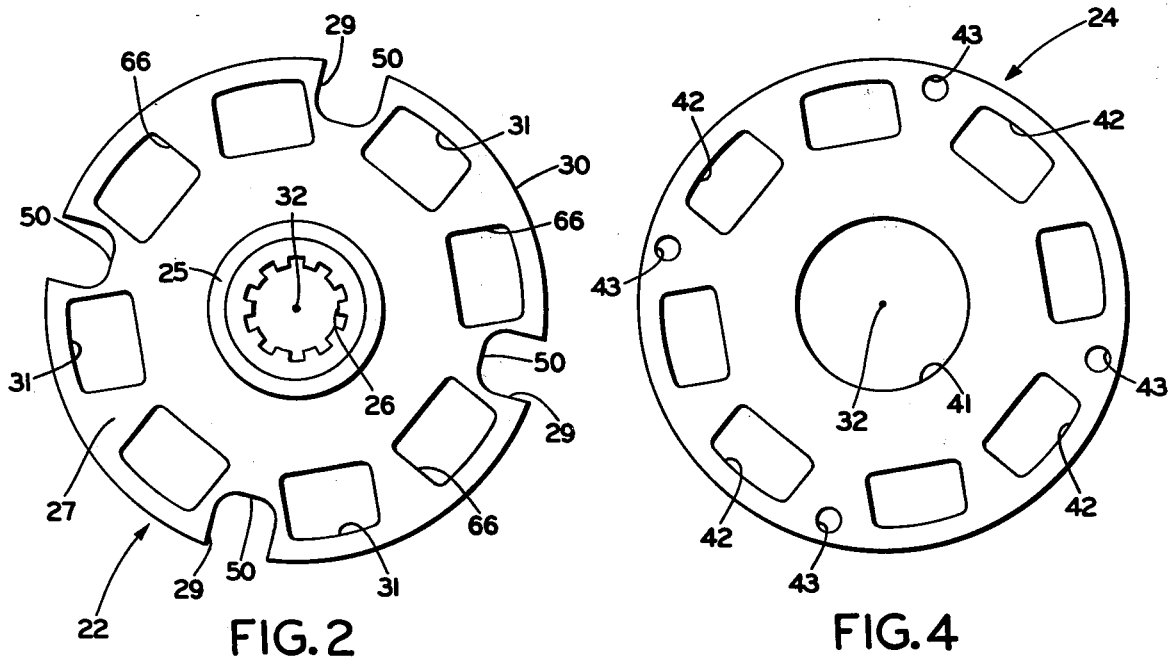
FIG. 2 is a top plan view of the inner hub member of the improved clutch friction plate.
FIG. 4 is a top plan view of the spring retainer plate of the improved clutch friction plate.

Friction plate assembly 17 (FIG. 5) includes as its main components an inner hub member 22, a friction drive plate 23, and a spring retainer plate 24, shown in FIGS. 2, 3 and 4, respectively. Hub member 22 includes an axially extending center hub 25 (FIGS. 2, 6 and 7) having an internally splined bore 26 which engages the complementary splined shaft portion 19 of transmission shaft 18 for mounting friction plate assembly 17 thereon. A radially extending hub flange 27 is formed integrally with hub 25 and has a generally flat annular configuration with a thickened inner annular portion 28 (FIG. 7) adjacent hub 25 for strengthening flange 27. A plurality of U-shaped slots 29 are formed in the outer periphery of hub flange 27 and extend radially inwardly from peripheral flange edge 30. Four slots 29 are provided in hub flange 27 (FIG. 2) and are spaced equally about the periphery of flange 27. The function of slots 29 is discussed below.

A plurality of openings 31, eight of which are shown in the embodiment illustrated in the drawings, are formed in the outer portion of hub flange 27 closely adjacent edge 30. Openings 31 have a generally rectangular configuration and are arranged in a circular pattern about and concentric to the axis, indicated at 32, of hub member 22, which axis also is the axis of friction plate assembly 17.

Drive plate 23 is a flat, relatively thin metal member having a central area 33 (FIG. 3) with three equally circumferentially spaced leg members 34 formed integrally with and extending radially outwardly from central area 33. This particular drive plate configuration is similar to the clutch friction plate shown in my earlier U.S. Pat. No. 3,897,859. A pair of friction pads 35 are mounted on each of the opposite faces of leg members 34 by a pair of rivets 36. Drive plate 23 need not have the particular three-legged configuration as illustrated in the drawings, and can be of a continuous circular configuration or modification thereof without affecting the concept of the invention.

A central aperture 37 is formed in drive plate area 33 and has a diameter complementary to the diameter of the cylindrical side wall portion 38 of hub 25 (FIG. 7) so as to provide a generally slip-fit engagement when assembled with inner hub member 22. A plurality of openings 39 are formed in central area 33 and are arranged in a circular pattern about and concentric to central opening 37, in a similar manner as openings 31 of inner hub member 22. Openings 39 are spaced equally about central area 33, and are arranged to align axially with openings 31 when mounted on hub member 22. Four pin receiving holes 40 are formed in the outer portion of central area 33 and are equally spaced thereabout and are adapted to axially align with the center of hub member slots 29 when assembled therewith.

Spring retainer plate 24 (FIGS. 4, 5 and 7) has a circular configuration and is formed from a relatively thin, flat piece of metal, and may have a diameter just slightly less than the diameter of inner hub member 22. Retainer plate 24 is formed with a central aperture 41 equal in size to opening 37 of drive plate 23 and complementary with cylindrical side wall 38 of hub 25 so as to provide a slip-fit engagement therewith. A plurality of openings 42 also are formed in retainer plate 24 and are arranged in a circular configuration and are axially aligned with and complementary to openings 31 and 39 of hub member 22 and drive plate 23 when in assembled condition. Openings 42 also have a rectangular configuration similar to openings 31 and 39. Four pin receiving holes 43 are formed in retainer plate 24 and axially align with holes 40 of drive plate 23.

In accordance with the invention, a plurality of damper spring assemblies, indicated generally at 45, are mounted within openings 31, 39 and 42 of the plate assembly components for rotationally coupling drive plate 23 and retainer plate 24 to inner hub member 22. Each damper spring assembly 45, the particular construction of which is described below, has a generally cylindrical outer configuration with an axial length complementary to the generally arcuate length of openings 31, 39 and 42 so as to be received therein when in assembled condition. The diameter of spring assembly 45 is equal to the radial dimension or width of hub member openings 31 so as to be snugly received therein with a minimum clearance between the edges of opening 31 and the ends and sides of assembly 45.

The radial dimension or width of openings 39 and 42 of drive plate 23 and retainer plate 24 is slightly less than the diameter of spring assembly 45 (FIG. 7) so as to prevent movement of assemblies 45 in an axial direction. Spring assemblies 45 are clamped and retained within openings 31 of hub member 22 by the clamping pressure of retainer plate 24 which is mounted in an axially spaced position on drive plate 23 by stop bolts 46.

Stop bolts 46 include a nut and bolt assembly 47 and 48 with a spacer sleeve 49 telescopically mounted on bolt 48. Sleeve 49 engages drive plate 23 and retaining plate 24 for spacing them in proper position with respect to inner hub member 22 and spring assemblies 45, as shown in FIG. 7. Four stop bolts 46 are spaced equally about center hub 25, with bolts 48 projecting through matching aligned holes 40 and 43 of drive plate 23 and retainer plate 24. Spacer sleeves 49 are located within slots 29 of inner hub member 22 with a predetermined amount of clearness being provided between the U-shaped edges 50 of slots 29.

Damper Spring Assembly

In accordance with another of the main features of the invention, is the unique construction of damper spring assemblies 45, which are shown in FIGS. 8–12. Spring assemblies 45 are identical to each other, and therefore, only one is described in detail and shown in the drawings.

Each assembly 45 includes a helical compression spring 51, preferably having a cylindrical configuration with a circular cross-section. In certain applications, spring 51 may have a rectangular cross-section or have a conical or truncated conical configuration, or various combinations thereof, without affecting the concept of the invention. Spring 51 is formed from a continuous coil of wire 52 having a circular cross-section as shown in FIG. 11, and wound into a helical arrangement (FIGS. 8 and 9). The endmost coils 53 and 54 are open and are ground to provide flat, generally circular end surfaces 55 and 56.

Compression spring 51 is wound with the individual coils indicated by numerals 52a–52e (FIG. 11), separated as in a usual compression spring construction so that the spring may be compressed. The cylindrical arrangement of continuous coil 52 provides for a hollow interior or tubular bore-like opening 57. Spring 51 is encapsulated or encased in an elastomer 60, which preferably completely fills the hollow interior 57 and spaces between and around individual coils 52a–52e to form a cylindrical block of elastomer with the exception of the space occupied by the continuous coil of wire 52. Thus, spring assembly 45 has a solid cylindrical configuration with circular end surfaces 61 and 62, which are generally complementary to and closely adjacent circular end surfaces 55 and 56 of endmost spring coils 52 and 54. A smooth continuous cylindrical side surface 63 of elastomer 60 extends longitudinally between end surfaces 61 and 62.

One particular type of elastomer found satisfactory for use in forming damper spring assemblies 45 for mounting in clutch mechanism 1 is a urethane elastomer. The particular urethane elastomer used is formed from a two-component liquid polyurethane casting system of the type described under the registered trademark "Conathane TU-90" of Conap, Inc. This urethane, when cured, has a shore "A" hardness of 90±5, a tensile strength of 4400 psi, an elongation of 550%, a tear strength (Graves) of 600%, a density of 0.040 lbs. per cubic inch, and a shrinkage of 0.004–0.007 in./in. This particular urethane elastomer has been found very satisfactory for the above clutch mechanism in that it can withstand relatively high temperatures that can be generated in operation of clutch mechanism 1, and has a high abrasion resistance.

It will be apparent to those skilled in the art that satisfactory, flowable and hardenable elastomer materials other than the particular urethane composition discussed above might be utilized in a manner that would not depart from the teachings of the present invention. For example, it is believed that various types of natural and synthetic rubbers, various compositions and formulations of urethane elastomers and numerous other elastomers would be satisfactory for encapsulating or encasing a coil spring therein in order to provide various operating characteristics, depending upon the particular application in which it is to be used.

Tests have shown that the particular unencapsulated coil spring 51 which was previously used for a clutch mechanism similar to clutch mechanism 1, when subjected to an axial compressive load of 200 lbs., indicated by arrow $F_1$ (FIG. 12), will compress $\frac{1}{8}$ inch. A cylindrical block of this urethane of the same general outer configuration and dimensions as spring 51 (shown by dot-dash lines and indicated at 64, FIG. 12) required an axial compressive load of 100 lbs., indicated by arrow $F_2$ to achieve a $\frac{1}{8}$ inch compression. Upon encapsulating spring 51 with the urethane of block 64, the resulting damper spring assembly 45 required an axial compressive load, indicated by arrow $F_3$, of 600 lbs. to achieve a $\frac{1}{8}$ inch compression.

This non-linear increase of compressive resistance or load rate of damper spring assembly 45 is believed to be due to the retention of the elastomer 64 within the general cylindrical confines of the encapsulated spring. The elastomer block 64 of FIG. 12 when compressed, will bulge outwardly as shown by lines 65, requiring less force to compress or move the elastomer than if the sides were confined. This bulging or radial expansion is prevented or greatly reduced by the cage-like cylindrical arrangement of the spring coils, thereby requiring a greater force to move and compress the elastomer material and spring combination.

Clutch Mechanism Operation

The circular end surfaces 61 and 62 of damper spring assemblies 45, when mounted within openings 31 of hub member 22 and openings 39 of drive plate 23, are engaged by the generally radially extending edges 66 and 67 of openings 31 and 39, respectively, to rotatably couple drive plate 23 with hub member 22. Retainer plate 24 merely retains spring assemblies 45 within openings 31 and 39 and does not appreciably assist in transferring the coupling force between hub member 22 and drive plate 23 except through stop bolts 46.

The operation of clutch mechanism 1 with improved friction plate assembly 17 having damper spring assemblies 45 mounted therein, is generally similar to that of a usual clutch mechanism using unencapsulated compression springs as the resilient coupling component. Release of the clutch pedal moves pressure plate 13 (through the bias of diaphragm spring 9) toward flywheel 3, clamping friction pads 35 between flywheel 3 and pressure plate 13. The rotational force of flywheel 3, which is imparted to drive plate 23 through friction pads 35, is transmitted to inner hub member 23 by coupling damper spring assemblies 45, which in turn rotates input shaft 18 through the splined connection of shaft 19 and hub bore 26.

The increased stiffness provided by encapsulated damper spring assemblies 45 absorbs a considerably greater amount of the coupling shock than heretofore unencapsulated compression springs. This absorption reduces to a minimum the amount of shock transferred to the vehicle driveline through shaft 18, yet provides positive coupling engagement between drive plate 23 and hub member 22. This increased stiffness of spring assemblies 45 further reduces the compression distance of the coupling springs, preventing or greatly reducing the rotational movement of inner hub member 22 with respect to drive plate 23. It also eliminates U-shaped edges 50 of slots 29 from engaging stop sleeves 49 with the resulting damage to stop bolts 46 as heretofore has occurred with similar friction plate assemblies using unencapsulated compression springs.

In General

The improved clutch friction plate and damper spring construction enables the shock absorbing, rotational transmission springs to have increased stiffness without an increase in their size, weight and configuration, without an appreciable change in overall spring dimensions, and with a relatively small increase in cost by encapsulating the usual heretofore used compression spring in an elastomer. This new clutch and spring construction prevents the inner hub from contacting the stop bolts and possibly damaging the plate assembly, as well as minimizing the vehicle driveline damage. The improved friction plate and spring construction enables existing clutch constructions to be utilized without any manufacturing change being required except for replacement of the heretofore unencapsulated springs with improved damper spring assemblies 45. Damper spring assemblies 45 also reduce clutch chatter by providing the stiffer dampening effect and reducing the rotational movement between the drive plate and inner hub member.

The improved damper spring assembly 45 can have numerous other applications than in the clutch friction plate assembly 17, discussed above. It can be used in almost any application that a heretofore unencased compression spring was used in order to increase the spring stiffness and shock absorbing characteristics without an appreciable increase in size and at a minimum cost. Various dampening or load rate characteristics can be achieved with the same inner metal spring component by merely changing the characteristics of the particular elasomer in which it is encased.

In applications where high temperatures are encountered, urethane has been found to be more satisfactory than rubber due to the breakdown of the rubber and its loss of dampening effectiveness when subjected to high temperatures. However, rubber elastomers or other synthetic elastomers would be entirely satisfactory to achieve various spring tension and dampening characteristics at lower temperatures. The interior of the spring need not be entirely filled with elastomer and can be provided with a hollow bore or opening through the elastomer merely resulting in a different dampening characteristic. Likewise, the compression spring element can have various configurations than the cylindrical helical design illustrated and described above, although this cylindrical configuration has been found to be most satisfactory for application in a clutch assembly. The spring component can also be a tension or torsional spring and be encased in an elastomer to achieve various spring characteristics. Spring assemblies 45 can be mass-produced relatively inexpensively by various molding and coating procedures with known equipment.

Accordingly, the friction plate and damper spring construction and assemblies provide simplified, effective, inexpensive and efficient devices which achieve all the enumerated objectives, provide for eliminating difficulties encountered with prior devices, and solve problems and obtain new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved friction plate and damper spring construction and assemblies are constructed and used, the characteristics of the construction, and the advantageous, new and useful results obtained; the new and useful structures, devices, elements, arrangements, parts, and combinations, are set forth in the appended claims.

I claim:

1. In a clutch friction plate construction of the type having a hub member and a relatively rotationally movable drive plate having friction elements thereon, and a plurality of resilient elements cooperating with said hub member and drive plate for rotationally coupling together said hub member and drive plate; the resilient elements each including a compression spring having a plurality of coils forming a generally open interior, with certain of the coils being spaced from each other; and an elastomer encapsulating the spring and completely filling the open interior and the spaces between said certain coils to increase the compression resistance of the resilient elements.

2. The construction defined in claim 1 in which the springs each have a cylindrical configuration with a pair of generally circular end coils; and in which the springs are arranged in a generally circular configuration about the axis of the hub means with the end coils of the springs being in abutting relationship with the hub member and drive plate.

3. The construction defined in claim 1 in which the hub member has a radially extending annular flange formed with a plurality of openings, with said openings being arranged in a circular pattern about the axis of said hub member; in which the drive plate is formed with a plurality of openings, with each of said drive plate openings being axially aligned with a corresponding opening of the hub member; and in which the encapsulated springs are located within said aligned openings for rotationally coupling together said hub member and drive plate.

4. The construction defined in claim 3 in which the hub member and drive plate openings have generally rectangular configurations complementary to the external size and configuration of the encapsulated springs; and in which the width of the hub member openings in a radial direction for the hub member axis is slightly larger than the corresponding length of the drive plate openings.

5. The construction defined in claim 1 in which a spring retainer plate is mounted on the hub member, with said hub member being located between said retainer plate and drive plate; in which a plurality of openings is formed in the retainer plate and axially align with the openings of the hub member and drive plate for receiving a portion of the encapsulated springs for rotationally coupling together the retainer plate to the hub member and drive plate.

6. The construction defined in claim 5 in which pin means extend between and axially retain together the retainer plate and drive plate.

7. The construction defined in claim 5 in which slots are formed in the hub member; and in which the pin means extend through the slots and are free of contact with the hub member.

8. The construction defined in claim 1 in which the drive plate has three circumferentially equally spaced, radially extending leg members; and in which the friction elements are mounted on outer ends of the leg members.

9. The construction defined in claim 1 in which the elastomer is urethane.

10. The construction in claim 9 in which the urethane has a density of approximately 0.040 lbs. per cubic inch.

11. Friction plate construction for a vehicle clutch assembly including:
 (a) hub means adapted to be mounted on a vehicle transmission shaft;
 (b) drive plate means mounted on the hub means and rotationally movable with respect to said hub means;
 (c) friction means mounted on the drive plate means for coupling frictional engagement with a corresponding clutch component;
 (d) a plurality of openings formed in the hub means and drive plate means, certain of said openings being axially aligned with respect to each other;
 (e) damper spring means mounted within the aligned openings and extending between the hub means and drive plate means for rotationally coupling together the hub means and drive plate means; and
 (f) the damper spring means including a compression coil spring and an elastomer, said coil spring being a helical wound coil of wire forming a hollow interior and having spaces between certain of the wire coils, said elastomer completely filling the hollow interior and spaces between said certain coils to increase the compression resistance of the coil spring, thereby reducing the relative rotation between the hub means and drive plate means upon the friction means being couplingly engaged with a corresponding clutch component.

12. The construction defined in claim 11 in which spring retainer plate means is mounted on the drive plate means, with the hub means being located between said retainer plate means and the drive plate means.

13. The construction defined in claim 12 in which openings are formed in the retainer plate means and axially align with the hub means and drive plate means opening for receiving a portion of the spring means.

14. The construction defined in claim 11 in which the coil springs each have a cylindrical configuration with generally circular end coils; in which the longitudinal axes of the springs lie in a generally circular pattern concentrically about the axis of the hub means.

15. The construction defined in claim 14 in which the end coils of the springs engage the drive plate means and hub means for coupling together said hub means and drive plate means.

16. The construction defined in claim 11 in which the elastomer is urethane.

* * * * *

UNITED STATES PATENT AND TRADEMARK OFFICE
CERTIFICATE OF CORRECTION

PATENT NO. : 4,197,931
DATED : April 15, 1980
INVENTOR(S) : John A. Norcia

It is certified that error appears in the above-identified patent and that said Letters Patent are hereby corrected as shown below:

Column 6, line 10, change "52" to -53-

Column 8, line 7, change "elasomer" to -elastomer-

Column 9, line 24, change "for" to -from-

Column 10, line 1, add -defined- after "construction"

Signed and Sealed this

Eighth Day of July 1980

[SEAL]

Attest:

SIDNEY A. DIAMOND

Attesting Officer   Commissioner of Patents and Trademarks